April 15, 1924.  
W. G. LAIRD  
1,490,469  
PROCESS OF AND APPARATUS FOR MAKING GAS BLACK  
Filed April 19, 1919  3 Sheets-Sheet 1

Patented Apr. 15, 1924.

1,490,469

UNITED STATES PATENT OFFICE.

WILBUR G. LAIRD, OF NEW YORK, N. Y., ASSIGNOR TO HENRY L. DOHERTY, OF NEW YORK, N. Y.

PROCESS OF AND APPARATUS FOR MAKING GAS BLACK.

Application filed April 19, 1919. Serial No. 291,188.

*To all whom it may concern:*

Be it known that I, WILBUR G. LAIRD, a citizen of the United States, residing at New York city, in the county of New York, State of New York, have invented certain new and useful Improvements in Processes of and Apparatus for Making Gas Black; and I do hereby declare the following to be a full, clear, and exact description of the invention, such as will enable others skilled in the art to which it appertains to make and use the same.

This invention relates to the manufacture of gas black and more particularly to a process of and apparatus for making gas black from gases containing hydrocarbons such as methane.

The only black manufactured from gas at the present time is the so-called carbon black which is made by burning natural gas with an open flame in such a manner that the flame will impinge against a cooled depositing surface. With this process of making carbon black, the yield is about three pounds per thousand cubic feet of gas. It will be seen that the efficiency of such a process is very low in view of the fact that the weight of the carbon content of a thousand cubic feet of average natural gas is about thirty-three pounds.

Another process which has been proposed for making gas black from natural gas consists broadly in decomposing the gas while passing it through an externally heated retort. This process has not been practicable because when a retort is used which has a sufficient size to give a capacity suitable for commercial operation, the stream of gas passing through the retort has such a large cross-sectional area that it cannot be heated uniformly throughout to effect a satisfactory decomposition of the gas. Gas containing hydrocarbons is a very poor conductor of heat and thus when such gas passes through a heated retort, the outer peripheral layer of the gas body is highly heated and will be decomposed while the central core of the gas body is less highly heated and will be only partially decomposed. The temperatures required to cause sufficient heat to be transmitted to the central portion of the body of gas in a commercial size retort in order to properly decompose all of the gas is so high, that it soon destroys practically any of the different kinds of refractory retorts. If lower temperatures are used, intermediate decomposition products are formed which form a deposit of coke on the walls of the retort. This coke deposit acts as an insulator to prevent the gas from being heated, and the deposit also tends to cause the walls of the retort to be burned out quickly.

A further process of making gas black which has been used consists in burning gas in a bed of refractory material to highly heat the same and then passing the hydrocarbon gas to be decomposed through the heated refractory bed and alternately repeating these steps. Although a hydrocarbon gas seems to be completely decomposed by this process, the yield of carbon is very low apparently for several reasons. First, a large body of carbon is left in the porous refractory body during the gas decomposing operation and this carbon is burned in the following operation of heating the refractory material. Second, when using practically any of the various types of refractory material under the alternate reducing and oxidizing conditions in the presence of carbon, chemical reactions appear to take place between the refractories and the carbon and between the carbon and the air and combustion gases. These reactions consume a large per cent of the carbon to form carbon monoxide and carbon dioxide gases. Carbon which is used in the formation of carbon-oxide gases is lost from the process recovery and the carbon-oxide gases are very detrimental to the hydrogen gas formed in the decomposition of the hydrocarbon. Third, the alternate heating and decomposition operations are slow and cause the loss of carbon and gas when purging the furnace for each operation. Fourth, the temperatures of the refractory bed rapidly decrease while the gas is being decomposed, and although the gas may be completely decomposed in the first part of the operation, a large amount of intermediate products are formed in the latter part of the operation. The presence of intermediate decomposition products in the gas black recovered is undesirable, and further the intermediate products are heavy and oily, and tend to remain in the refractory bed.

The above processes of making gas black by the heat decomposition of natural gas, have not produced a black which has been acceptable to the trade. This black contains a large number of different isomeric forms of carbon and the heat decomposition is not sufficiently accurately controlled to produce a uniform product. Many of the isomeric forms of carbon are not suitable for the manufacture of paints, inks, carbon electrodes, etc., and the carbon black made by the above processes does not seem to contain the isomeric forms which will adapt the black for these uses. Further, the gas black contains intermediate decomposition products and hard gritty materials which make it unacceptable for use in paints and inks. Some of the intermediate products consist of tars and tar acids which cannot be used with the paint and ink vehicles.

With this in view, the primary object of the present invention is to provide a process of making gas black with a heat decomposition of a hydrocarbon gas or vapor by which the character of black being formed may be accurately controlled.

Another object of the present invention is to provide a process of making gas black which will give an efficient yield of gas black from a hydrocarbon gas and which will overcome the objections noted above.

Accordingly, one feature of the invention contemplates decomposing a hydrocarbon gas by continuously passing the gas in the form of a thin stream of definitely controlled cross-sectional area through a closed channel formed of high refractory material and transmitting heat of sufficiently high temperature through the refractory material to completely decompose the hydrocarbon gas in said channel.

Another object of the invention is to provide an apparatus in which a hydrocarbon gas may be effectively and efficiently decomposed to form gas black and hydrogen.

With these and other objects in view, the invention consists in the improved process of and apparatus for making gas black hereinafter described and defined in the claims.

The various features of the invention are illustrated in the accompanying drawings, in which,—

Fig. 5 is a detail plan view of the apparatus for cooling the decomposed gas and for separating the gas black therefrom.

In the preferred process of the invention, the hydrocarbon gas is decomposed in a closed refractory retort which is heated externally by the combustion of fuel and the retort is arranged to exclude flue or other oxidizing or reducing gases from the gas being decomposed. The hydrocarbon gas is preheated before entering the retort and commences to decompose soon after it enters. The temperatures in the retort are gradually increased in the direction of flow of the gas and therefore the gas is gradually decomposed with the formation of some carbon and some intermediate products. Sufficiently high temperatures are maintained throughout the entire area of the retort in the hottest zone to completely decompose any hydrocarbon remaining in the gas which reaches this zone and to completely decompose any intermediate products which are present in the gas reaching the zone. To insure that the gas will be completely decomposed, it is held in a thin stream of a fixed definitely controlled cross-sectional area throughout its travel through the retort. The thickness of the stream is determined primarily by the temperatures required to decompose the gas, but should be of such thickness that heat of sufficiently high temperature to completely decompose all the hydrocarbons of the gas may be driven through the walls of the retort and penetrate through the entire area of the stream in the highest temperature zone. In the lower temperature zones of the retort, the gas directly adjacent the walls of the retort may be completely decomposed, but the gas in the central portion of the stream is only partially decomposed. The carbon deposited by the incomplete decomposition of the gas in the cooler zones gives a medium by which radiant energy in the form of heat may be used at the high temperature zones to carry the high temperatures through the entire area of the retort. In this way, the gas may be decomposed in a body as distinguished from decomposing gas in a surface film.

Figure 1:
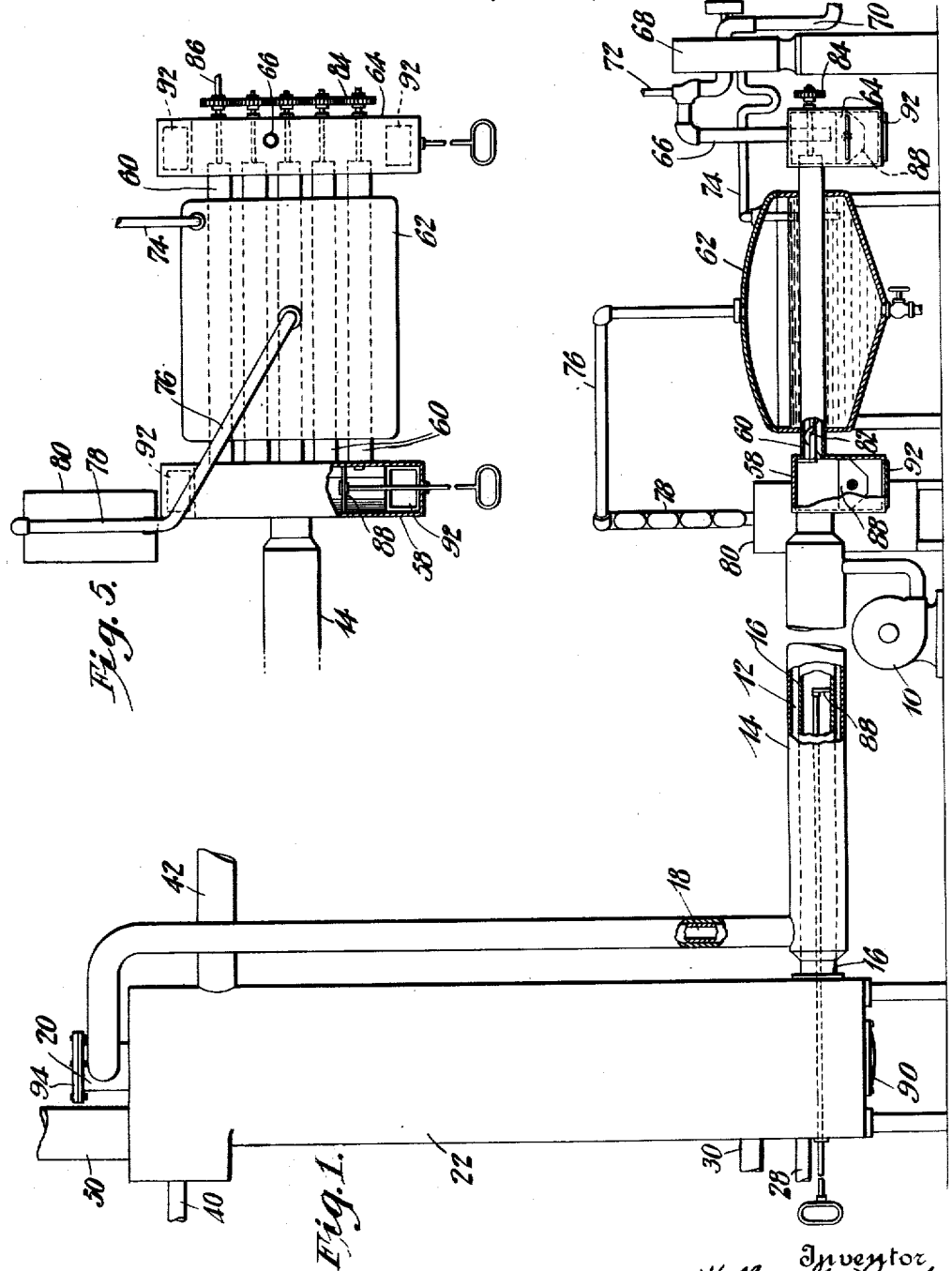
Figure 1 is a diagrammatic view in side elevation illustrating an apparatus in which may be carried out a process of making gas black embodying the preferred form of the invention.
Figure 2:
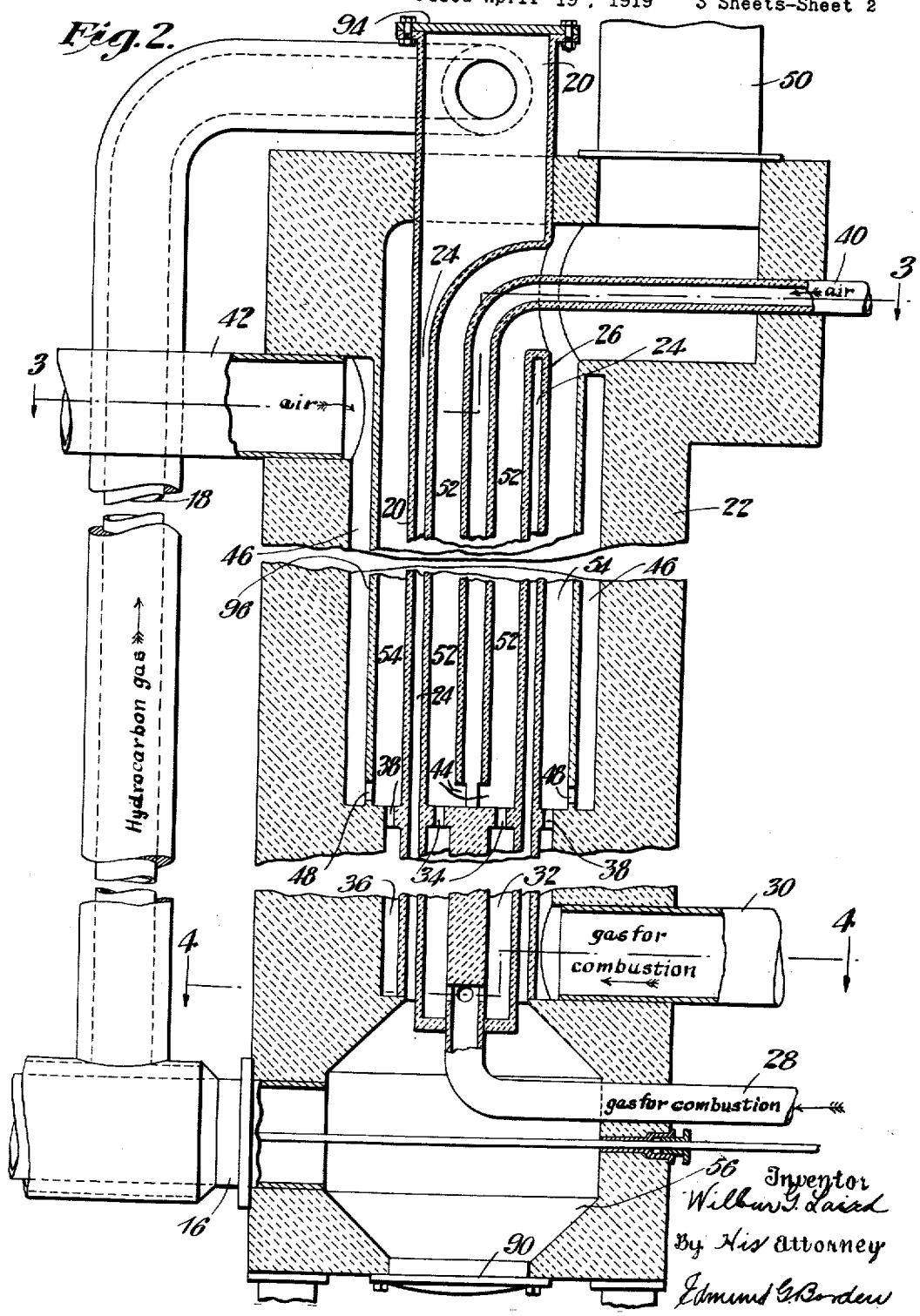
Fig. 2 is a vertical sectional view of the gas-black furnace and decomposing retort.

The decomposition of gas to form gas black and hydrogen in accordance with the preferred form of the invention may be carried out in the apparatus illustrated in the drawings as follows: The hydrocarbon gas which preferably consists of a natural gas containing a high percentage of methane or an artificial gas containing a high percentage of hydrocarbons is drawn in by means of a blower 10 and forced through a channel 12 formed between a jacket 14 and an inner cooling pipe 16 (Fig. 1). The gas is heated in passing through the channel 12 and is conducted by means of an insulated pipe 18 to the upper end of a cracking retort 20. The cracking retort 20 (Fig. 2) is preferably supported in a vertical position and mounted in the central portion of a furnace 22. The gas entering the retort 20 passes downwardly through a comparatively narrow gas decomposing space 24 which is formed between the inner surface of the retort 20 and the outer surface of an inner retort 26 supported centrally of the retort 20. The hydrocarbons in the gases being cracked do not start to decompose until they are heated to comparatively high temperatures so that practically all of the decomposition of the hydrocarbons takes place while the gas is passing through the space 24. The space 24 is heated by the combustion of fuel within the retort 26 and around the retort 20. The fuel for combustion preferably consists of by-product gases formed in the process of recovering the gas black and is composed principally of hydrogen. The fuel gas is led into the furnace through pipes 28 and 30, the gas entering through the pipe 28 passing through a conduit 32 to burner ports 34 and the gas entering through the pipe 30 passing through a conduit 36 to burner ports 38. Air for burning the gas at the ports 34 and 38 is led into the furnace through pipes 40 and 42. The pipe 40 passes through the inner retort 26 and introduces air through ports 44 directly above the ports 34. The air entering through the pipe 42 passes through a preheating flue 46 and is introduced through ports 48 directly above the ports 38. The gas introduced through the pipes 28 and 30 and the air introduced through the pipes 40 and 42 are preferably controlled by positive pressure blowers, but on the other hand, the introduction of the air and gas may properly be controlled by means of a suction fan connected with the furnace exhaust stack 50. The air and gas burned above the ports 34 pass upwardly through a combustion chamber 52 formed within the inner retort 26 and the flue products exhaust into the stack 50. The gas and air burned above the ports 38 pass through a combustion chamber 54 formed around the retort 20 and the flue products exhaust into the stack 50. The combustion of gas above the ports 34 and 38 produces the highest temperature zone in the decomposing space 24 at approximately the middle or mid portion of the retort or decomposing space 24. The products of combustion passing upwardly through the combustion chambers 52 and 54 produce gradually decreasing temperatures in the space 24 from the mid zone to the upper end of the retort 26 and thus the gas entering through the pipe 18 will be gradually decomposed in passing downwardly through the decomposing space. After leaving the mid portion of the space 24, the highly heated gas passes directly in contact with the gas conduits 32 and 36 to preheat the gas for combustion entering through the pipes 28 and 30. At the same time, the decomposed gas carrying the gas black in the space 24, is cooled. The high temperature combustion is maintained in the combustion chambers 52 and 54 by preheating the air passing through the conduits 40 and 46. The air entering through the pipe 40 is preheated by the products of combustion in the combustion chamber 52 and the air passing through the conduit 46 is preheated by the products of combustion in the combustion chamber 54. This construction permits an interchange of heat between the products for combustion and the combustion products so that the combustion products will exhaust through the stack 50 in a comparatively cool state.

The hydrocarbon gas to be decomposed is passed through the decomposing space 24 at a comparatively high velocity to sweep the carbon out of the retort 20 to prevent the carbon from clinging to the walls of the retorts 20 and 26 and clog the space 24. The lower end of the retort 20 is open throughout its entire diameter so that the gas and carbon has a free exhaust into a carbon-separating chamber 56 formed in the bottom of the furnace 22. When the gas enters the chamber 56, the velocity is reduced to permit a large percentage of the carbon to deposit in the chamber. The gas containing some carbon then flows from the chamber 56 through the cooling pipe 16 (Fig. 1) and passes through a carbon-collecting box 58 into a series of pipes 60 (Fig. 5). The pipes 60 pass in a horizontal direction through a cooler-evaporator 62 and discharge the gas into a second carbon-collecting box 64. The gas leaves the carbon-collecting box 64 through an outlet pipe 66 and is conducted to the center of a centrifugal liquid scrubber 68. After passing through the scrubber 68, the gas, consisting principally of hydrogen, flows through a pipe 70 and may pass through purifiers to be placed in storage. As the gas flows through the pipe 66, a liquid scrubbing menstruum is introduced into the gas through a pipe 72 and the menstruum together with any gas black removed from the gas flows through a pipe 74 into the cooler-evaporator 62. Any excess of liquid menstruum used in separating the carbon from the gas is driven off by evaporation in the cooler evaporator 62 and passes through a pipe 76 to a condenser 78 and is collected in a box 80. The evaporation of the liquid menstruum in the cooler-evaporator 62 acts to cool the gas passing through the pipes 60 to assist in depositing the carbon carried by the gas. A series of spiral conveyors 82 are mounted in the pipes 60 which act to discharge carbon deposited therein in the boxes 58 and 64. The conveyors 82 are interconnected by gears 84 which may be driven through a power shaft 86. The carbon deposited in the cooling pipes 16 and carbon-collecting box 64 may be collected by scrapers 88. The carbon collected in the chamber 56 is removed through a door 90 mounted in the bottom of the furnace and the carbon collected in the boxes 58 and 64 is removed through doors 92 mounted at the bottom of each end of the boxes.

The construction of the decomposing retorts 20 and 26 is very important in that the proper construction permits a rapid and complete decomposition of gas in a continuous stream. The decomposing space 24 should have such a width that the gas passing therethrough will have a high velocity to keep it in active agitation for an efficient heat transfer, and also to allow a large volume of gas to be treated. The temperatures in the combustion chambers 52 and 54 are not sufficiently high at the upper end of the retort 26 to completely decompose the gas, but portions of the gas directly in contact with the walls of the retorts 20 and 26 will be completely decomposed to deposit carbon. This carbon floating through the gas gives a medium by which radiant energy may be absorbed in the form of heat near the mid-portion of the passage 24 to carry the heat into the body of the gas. Moreover, the temperatures at the upper end of the combustion zones 52 and 54 are sufficiently high to prevent the formation of heavy tarry decomposition products of a type that will clog the upper end of the space 24. Such decomposition products as are formed will be carried along with the gas to be completely decomposed at approximately the hot mid zone of the space 24. In order to secure a complete decomposition of methane in the short space of time in which the gas remains in the decomposing space 24, it is necessary to have decomposing temperatures above 2200° F. Although methane may be completely decomposed at temperatures below 2200° F., to obtain such a decomposition the gas must be heated to temperatures below 2200° F. for a comparatively long period of time. The temperatures at the upper end of the decomposing space 24 are materially below 2200° F. but temperatures above 2200° F. are maintained at the hot mid zone, to not only decompose the methane remaining in the gas reaching the mid zone, but to decompose intermediate decomposition products present in the gas. It has been found that decomposition products often require higher temperatures to decompose them than the temperature required to decompose the original methane. The space 24 permits the gas to be held in a thin stream of definitely controlled cross-sectional area in its entire passage through the decomposing retort so that a complete and uniform decomposition may be effected. If, after a continued operation carbon has collected in the space 24, this carbon may be easily removed by means of a scraper which can be inserted through the top of the retort 20, by removing a cover 94. The carbon preferably is scraped downwardly through the space 24 and discharged into the collecting chamber 56.

The width of the gas decomposing space 24 depends upon the character of gas being decomposed, the kind of fuel used in heating the decomposing retort, the kind of carbon product to be formed, and the velocity of passage of gas through the retort. Some hydrocarbon gases such as ethane, ethylene and acetylene do not require as high temperatures as methane, to be completely decomposed. When decomposing these gases, therefore, it is not necessary to have the space 24 as narrow as when cracking methane which requires a very much higher temperature. Further, when decomposing any gas, it is essential that the space 24 shall not become clogged with carbon, and regardless of the temperatures used for decomposing, the space 24 must be sufficiently wide to permit the carbon to be swept out of the space. With higher velocities of gas through the space 24, the space may be narrower, but with a narrower space, higher temperatures are required in order to supply sufficient heat for decomposing the gas. When decomposing methane, more effective results may be obtained by employing a high temperature fuel in order to maintain the high temperatures required for transmitting heat through the walls of the retort. The hydrogen gas which is formed in the decomposition of methane is an excellent fuel for this purpose since it gives a high flame temperature and a high flame propagation, and will thus insure high temperatures along the walls of the retorts 20 and 26. Natural and artificial gases may also be used with excellent results for maintaining the proper temperatures and by preheating the air and gas to be burned in the combustion chambers, higher flame temperatures may be obtained.

When operating at high temperatures which are necessary for completely decomposing methane, as for instance, 2500° F., there is a strong tendency for the carbon to react with the bases of the refractory materials to form carbides, and a great tendency for the oxygen of the flue products to react with the carbon and the refractories to form oxides. The reactions between the carbon, oxygen and the refractories are mostly reversible and are the source of high losses of carbon. To overcome these losses, the hydrocarbon gas is isolated as far as possible from flue products and from basic materials which will form carbides. Carborundum will stand the high temperatures necessary for decomposing methane and can be built up in comparatively thick-walled retorts because its heat conductivity is very high at high temperatures. Practically all refractories become very porous when heated to high temperatures and under such conditions there is a great tendency for oxidizing and reducing gases to pass through the retort walls. Carborundum has been found to be very dense and to give a comparatively high resistance to the passage of gases therethrough when heated at high temperatures. However, to further eliminate the passage of flue gases from the combustion chambers 52 and 54 to the decomposing space 24, the pressure blower 10 and the centrifugal scrubber 68 are operated so as to maintain a higher pressure within the space 24 than in the combustion chambers 52 and 54. With this arrangement, any passage of the gases between the combustion chambers 52 and 54 and the space 24 will be a passage of hydrogen gas from the space 24 through the walls of the retorts into the combustion chambers. In this way, the oxidizing gases and flue products are eliminated from the space 24. After the retort has been operated for some time, the porous walls of the retort become clogged with carbon which greatly reduces this flow of gas. Also, since the carborundum is a carbide, there is very little tendency for a reaction to take place between the carbon and the carborundum retort, especially when oxidizing gases are eliminated.

The gas is preferably decomposed in the space 24 at substantially atmospheric pressure. Higher or lower pressures, however, may be maintained in the space 24, if desired, by forcing the flue products through the combustion chambers 52 and 54 under higher or lower pressures. If gas is burned under pressure in the combustion chambers, however, the pressure in the space 24 is maintained higher than the pressure in the chambers 52 and 54. When decomposing the gas in the space 24 at substantially atmospheric pressure or lower, the combustion in the chambers 52 and 54 is preferably controlled by means of a suction fan connected with the stack, and the fan is preferably regulated to maintain sub-atmospheric pressures in the combustion chambers.

Figure 3:
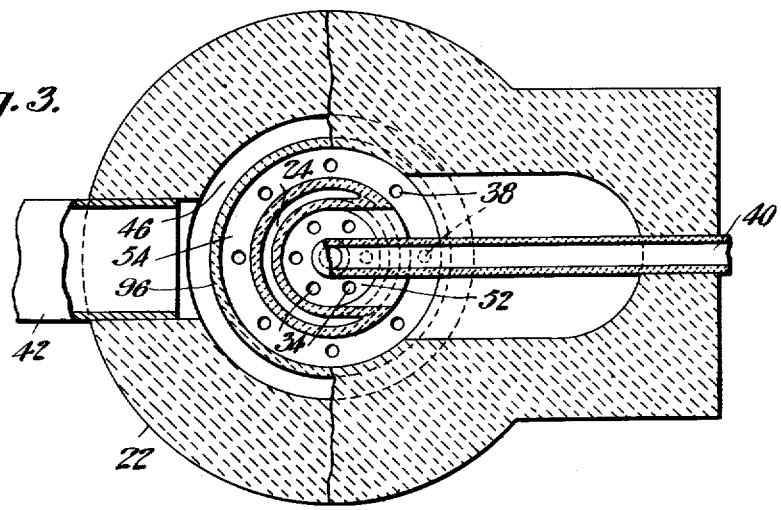
Fig. 3 is a horizontal sectional view of the gas-black furnace taken on the line 3—3 of Fig. 2.
Figure 4:
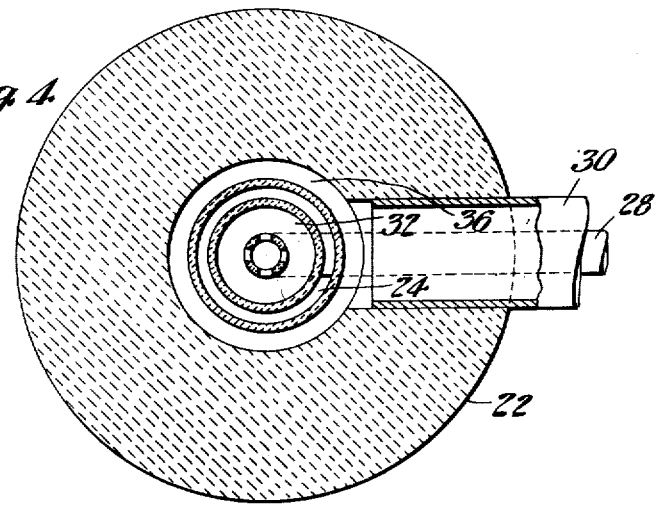
Fig. 4 is a horizontal cross-sectional view of the gas-black furnace taken on the line 4—4 of Fig. 2.

The furnace 22 may be constructed of any of the preferred forms of refractory materials. It is preferred, however, to construct the partition walls 96 (Fig. 3) which separate the preheating air conduit 26 from the combustion chamber 54, and the air tube 40, of a high refractory such as carborundum. It will be noted that the carborundum retorts, the partition wall 96, and the pipe 40, are mounted in a vertical position so that they are not subjected to any appreciable weight. Further, the materials when mounted in a vertical position are capable of withstanding greater weight and will not be easily deteriorated when subject to high temperature conditions.

With the construction outlined above, the gas and air for combustion are preheated by the heat in the gas being decomposed and by the exhaust products of combustion. The gas to be decomposed is preheated by the decomposed heated gas. In the decomposing retort, the highest temperature is maintained at the mid portion and the gas is gradually decomposed in advancing to said mid portion and is gradually cooled as it advances away from said mid portion. This operation gives an economic heat balance to assist in maintaining a uniform temperature decomposition with a minimum expenditure of heat.

Various forms of carbon may be made in the furnace described above by varying the kind and quantity of gas being decomposed and the decomposing temperatures. By using a gas having a uniform quantity of hydrocarbons, maintaining a uniform decomposing temperature, and having the hydrocarbon in a thin stream of definitely controlled cross-sectional area, a product of uniform quality and color may be obtained. This is very important in that the blacks on the market vary greatly in color and physical properties. Many blacks contain oily, acid materials which make them unsuited for work in inks and paints, and others contain hard gritty material which is formed by decomposition products. With the apparatus outlined above, the gas while being decomposed and the temperature control gives such a control of the process that the product may have uniform properties. By maintaining a rapid decomposition at high temperatures, a light, fluffy product may be obtained which is free of decomposition products and oily, acid materials. The process, however, permits a wide range of operation to produce different kinds of products.

The gas black which is used in making printers' ink and paints is preferably carried in a vehicle. These vehicles usually consist of linseed oil, linseed oil varnish, turpentine, castor oil, resin oil or mineral oil. It is quite difficult to remove the lightest carbon from the gas and for this purpose it is preferred to scrub the gas with one of the vehicles mentioned above. These vehicles are admitted through the pipe 72 (Fig. 1) into the gas and act as the scrubbing medium for removing the carbon from the gas. This vehicle with carbon then passes to the evaporator 62 where the excess vehicle is removed and the carbon in the vehicle is then removed from the bottom of the evaporator in condition for use directly in the manufacture of inks and paints.

In the claims, the expression "methane gas" is intended to include a gas which carries a substantial percentage of methane.

The expression "hydrocarbon gas," also, is intended to include any gaseous or vaporous hydrocarbon which may be decomposed by heat. The term "liquid vehicle" in the claims is intended to define a liquid vehicle such as mentioned above in which the carbon is collected and held as a menstruum until it is used in the manufacture of inks and paints, or similar materials, the word "vehicle" being used to distinguish the liquid from an ordinary scrubbing liquid which is usually separated from the carbon after the scrubbing treatment.

The preferred form of the invention having been thus described, what is claimed as new is:

1. A process of making gas black, comprising advancing a methane gas in a thin stream of substantially fixed cross-sectional area through a channel enclosed by a refractory diaphragm, decomposing said methane by imparting heat through said diaphragm through a substantial distance of travel of said gas along said diaphragm, and progressively increasing the decomposition temperature in the direction of flow of said gas.

2. A process of making gas black, comprising advancing hydrocarbon gas through a refractory container which is porous at high temperatures, externally heating said container to the decomposition temperature of said hydrocarbons by a combustion of fuel, maintaining a sufficiently high velocity of gas through said container to remove carbon therefrom, and holding the pressure within said container higher than the external pressure to prevent infiltration of gases into said container.

3. A process of making gas black, comprising continuously passing methane gas in the form of a thin stream of fixed cross-sectional area through a closed channel formed of highly refractory material, and decomposing said gas by heat passing through the walls of said refractory material from the outside of said channel.

4. A process of making gas black, comprising continuously passing a hydrocarbon gas in the form of a thin stream of fixed cross-sectional area through a closed channel formed of highly refractory material, heating said refractory material to decompose gas in the channel and passing the decomposed gas into heat-interchanging relation with fresh gas advancing to said container.

5. A process of making gas black, comprising continuously passing methane gas in the form of a thin stream of fixed cross-sectional area through an elongated refractory container, circulating said gas at a high velocity, heating the walls of said container at opposite sides of said stream, and maintaining the temperatures outside of a portion at least of said container to bring the entire area of the stream within the container to a sufficiently high temperature to completely decompose hydrocarbons in the gas.

6. A process of making gas black, comprising continuously passing hydrocarbon gas in the form of a thin stream of fixed cross-sectional area through an elongated refractory container, circulating said gas at a high velocity, heating the gas stream by heating the external walls of said container along a substantial portion of its length, progressively increasing the temperatures in said container in the direction of flow of the gas, and maintaining a temperature in one portion of said container sufficiently high to completely decompose the hydrocarbons in the gas.

7. A process of making gas black, comprising continuously passing methane gas through a refractory container, decomposing said gas by heating the external walls of said container, and maintaining the gas within said container in a definitely controlled stream of such thickness that heat of sufficiently high temperature to completely decompose said gas will be driven entirely through said sheet by radiation.

8. A process of making gas black, comprising advancing a hydrocarbon gas as a thin stream of substantially fixed cross-sectional area through a channel enclosed in a refractory material, decomposing said gas by the combustion of fuel longitudinally of the outside of said channel, and circulating said gas countercurrent and in a substantially parallel path to the path of flow of said gaseous combustion products.

9. A process of making gas black, comprising continuously passing a hydrocarbon gas in the form of a thin stream through a refractory container, heating the outside of said container by the combustion of fuel, increasing the temperatures in said stream in the direction of flow of said gas, maintaining sufficiently high temperatures in the cooler zones of said container to deposit free carbon in said gas, and maintaining sufficiently high temperatures in the hottest zone of said container to completely decompose the hydrocarbons in the gas.

10. A process of making gas black, comprising continuously passing a hydrocarbon gas downwardly in a thin sheet through an unobstructed channel enclosed by refractory material, externally heating the container to gradually decompose hydrocarbons of the gas as it advances, maintaining a sufficiently high temperature near the lower end of said container to completely decompose all hydrocarbons in said gas, controlling the velocity of said gas to sweep hydrocarbon out of said container, and reducing the pressure of said gas after it is completely decomposed to deposit carbon therefrom.

11. A process of making gas black, comprising passing methane gas in a thin sheet through a closed container, decomposing said gas by heating the walls of said container at opposite sides of said sheet, and preheating products for combustion by the heated exhaust products of combustion.

12. A process of making gas black, comprising passing a hydrocarbon gas downwardly at a high velocity in a thin stream through a closed unobstructed channel surrounded by refractory material, decomposing said gas by heating the external surface of said refractory material, reducing the pressure of the decomposed gas in a comparatively large chamber, and separating carbon from the gas.

13. A process of making gas black, comprising passing methane gas through a closed container, decomposing said gas in the container by heat, reducing the pressure of the gas leaving said container, cooling said gas to deposit carbon by a heat interchange with gas flowing to the container, and separating carbon from said gas in a liquid vehicle.

14. A process of making gas black, comprising passing hydrocarbon gas through a closed container, decomposing said gas by heat, reducing the pressure of gas leaving said container, cooling said gas to deposit carbon, separating carbon from said gas in a liquid vehicle, and employing said liquid vehicle for cooling said gas.

15. An apparatus for making gas black having, in combination, an inner retort, means for burning fuel within said retort, an outer retort arranged to surround said inner retort with its walls spaced a comparatively short distance from the walls of said inner retort, means to burn fuel around the outer surface of said outer retort, means to conduct methane gas through the space between said retorts, and carbon-separating devices connected with said outer retort.

16. An apparatus for making gas black having, in combination, an inner retort, an outer retort arranged to surround said inner retort with its walls spaced a comparatively short distance from the walls of said inner retort, means to burn fuel around the outer surface of said outer retort, means to conduct a hydrocarbon gas through the space between said retorts, and carbon-separating devices connected with said outer retort.

17. An apparatus for making gas black having, in combination, an inner refractory retort, an outer refractory retort having its walls spaced a comparatively short distance from said inner retort, said retorts being closed to prevent passage of gas from one to the other, means to burn fuel within said inner retort, and carbon-separating devices connected with said outer retort.

18. An apparatus for making gas black having, in combination, an outer retort having one end open, a gas inlet at the other end of said outer retort, an inner retort positioned within said outer retort to leave a comparatively narrow space between said retorts, one end of said inner retort passing through the walls of said outer retort at its gas inlet end, the other end of said inner retort being closed, carbon-separating devices communicating with the open end of said outer retort, and means to burn fuel within said inner retort and around said outer retort.

19. An apparatus for making gas black having, in combination, an outer retort having one end open, a gas inlet at the other end of said outer retort, an inner retort positioned within the outer retort to leave a comparatively narrow space between said retorts, said retorts being closed to prevent the passage of gas from one to the other, a pressure-reducing chamber communicating with the open end of said outer retort, carbon-separating devices connected with said chamber, and means for burning fuel within said inner retort and around said outer retort.

20. An apparatus for making gas black having, in combination, an outer retort mounted in an upright position having its lower end open and its upper end closed, a hydrocarbon gas inlet connected to the upper end of said outer retort, a pressure-reducing chamber connected with the open end of said outer retort, an inner retort having its walls spaced a comparatively short distance from the walls of said outer retort, a combustion chamber surrounding said outer retort, and means to burn fuel in said combustion chamber, said combustion chamber and outer retort being closed to prevent the passage of gas from one to the other.

21. An apparatus for making gas black having, in combination, an outer retort open at one end and having a gas inlet at its opposite end, an inner retort positioned within said outer retort to leave a comparatively narrow space between them, a combustion chamber within said inner retort, a combustion chamber adjacent said outer retort, air and gas conduits communicating with each of said combustion chambers, one set of conduits being arranged in a heat-interchanging relation with said combustion chambers and the other set of conduits being arranged in heat-interchanging relation with said retorts, and carbon-separating devices connected with said retort.

22. An apparatus for making gas black having, in combination, a retort, means for heating the outer surface of said retort, a carbon-separating conduit connected with said retort, a gas inlet conduit connected with said retort and passing in heat-interchanging relation with said separating conduit, and a liquid cooled conduit connected with said separating conduit.

23. An apparatus for making gas black having, in combination, a retort, means for heating the outer surface of said retort, means to force gas through said retort, a cooler-evaporator, gas conduits mounted in said cooler-evaporator and connected with said retort, a liquid gas scrubber connected with said conduits, and means for leading liquid from said scrubber to said cooler-evaporator.

24. An apparatus for making gas black having, in combination, a refractory outer retort, a refractory inner retort spaced a short distance from said outer retort, a combustion chamber surrounding said outer retort, a combustion chamber within said inner retort, gaseous fuel-burning devices positioned in said chambers at a mid portion of said retort, air conduits mounted in heat-interchanging relation with said combustion chambers and leading to said burning devices, and gas conduits mounted in heat-interchanging relation with said retorts and leading to said burning devices.

25. An apparatus for making gas black having, in combination, a refractory retort having a comparatively narrow gas passage therein, means for introducing a hydrocarbon gas into the gas passage of said retort, means to burn fuel around the outer surface of said retort, means to burn fuel within said retort, said gas passage being arranged to exclude combustion gases therefrom, and carbon-separating devices connected with the gas passage of said retort.

In testimony whereof I affix my signature.

WILBUR G. LAIRD.